Oct. 9, 1923. 1,469,854
G. J. STUART
COMPOUND REGULATING VALVE
Filed Feb. 28, 1921  2 Sheets-Sheet 2
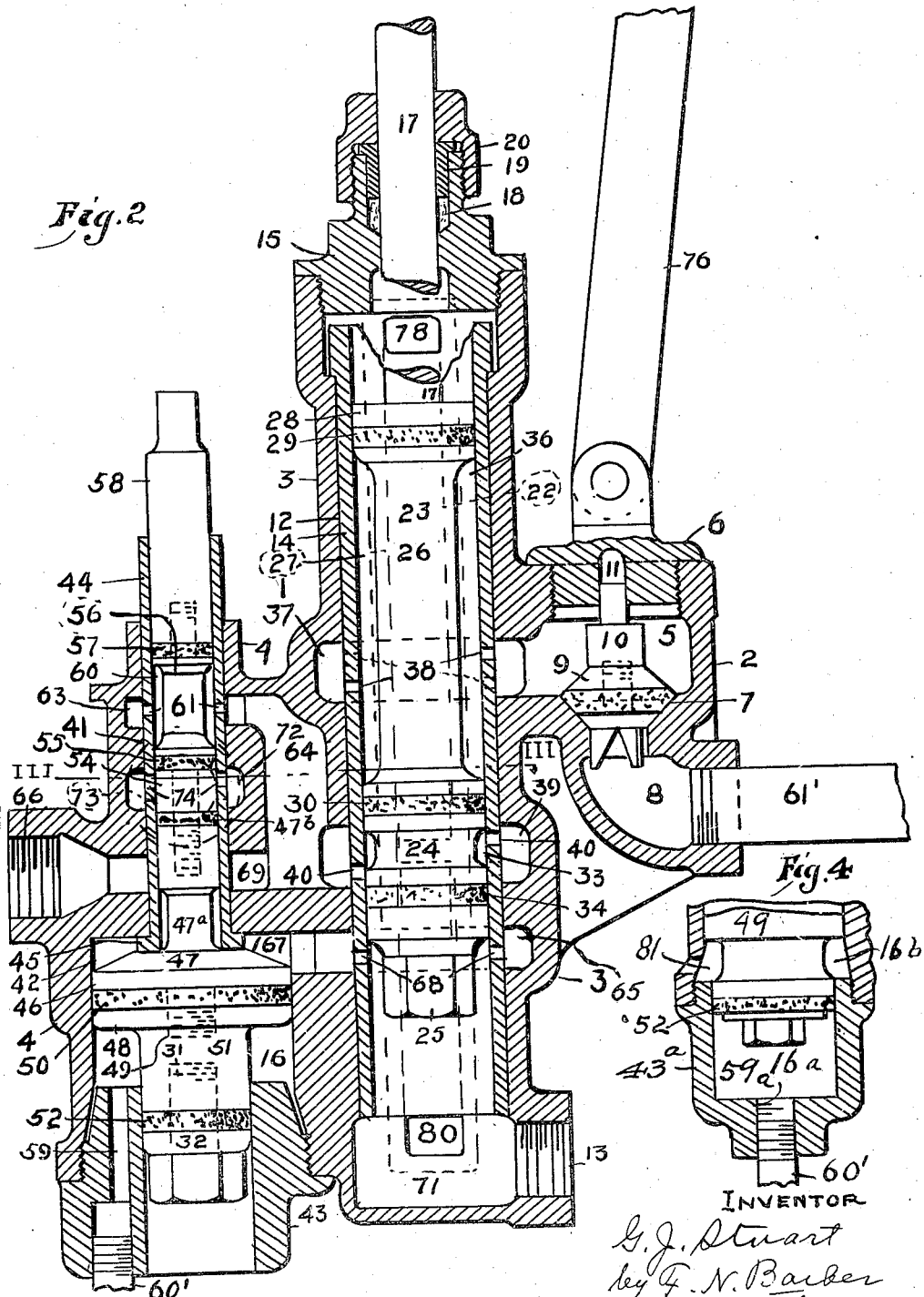

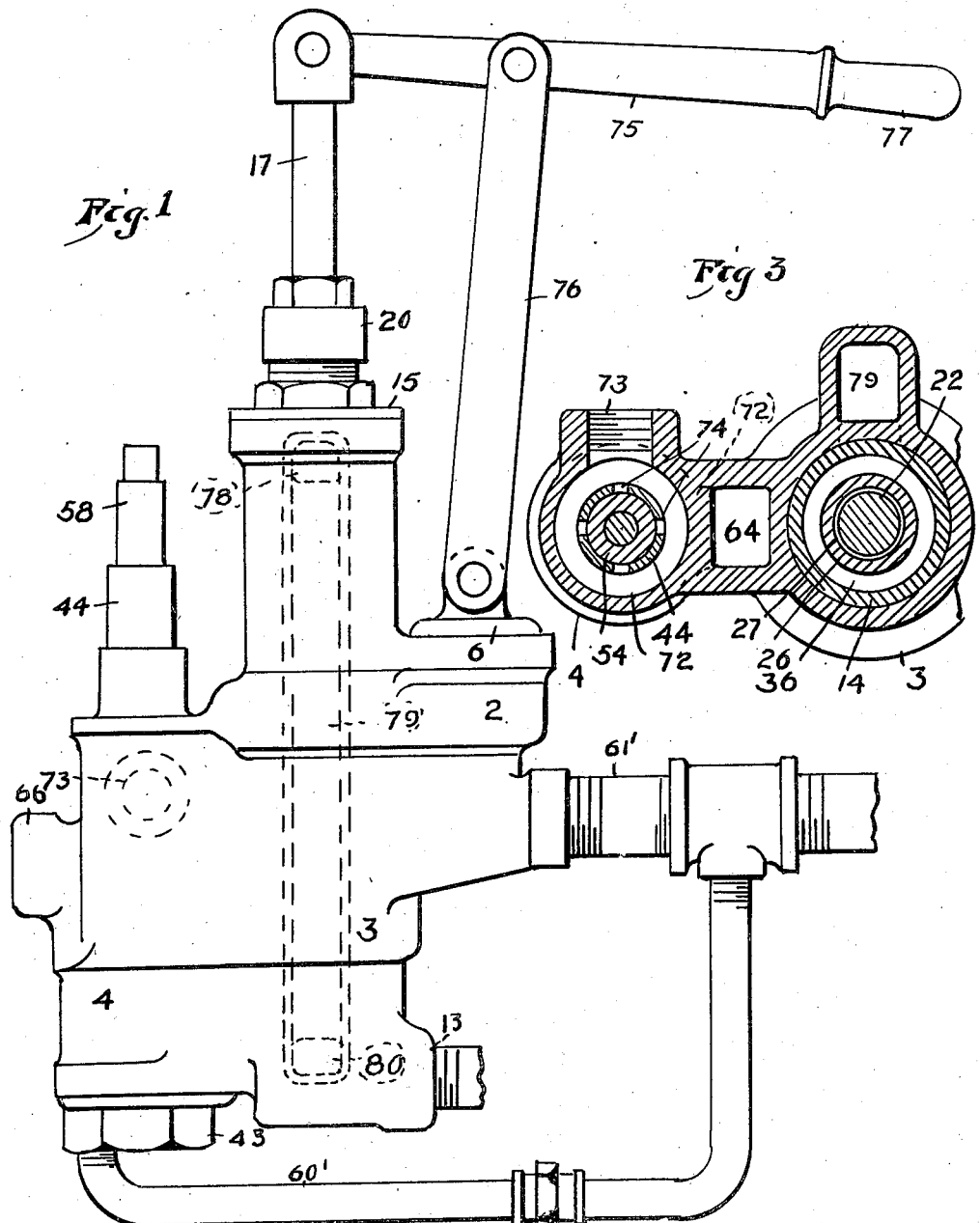

Patented Oct. 9, 1923.

1,469,854

UNITED STATES PATENT OFFICE.

GEORGE J. STUART, OF PITTSBURGH, PENNSYLVANIA.

COMPOUND REGULATING VALVE.

Application filed February 28, 1921. Serial No. 448,571.

*To all whom it may concern:*

Be it known that I, GEORGE J. STUART, a citizen of the United States, residing at Pittsburgh, in the county of Allegheny and State of Pennsylvania, have invented new and useful Improvements in Compound Regulating Valves, of which the following is a specification.

My invention relates to valves and has particular reference to valves for controlling the sequential flow of fluids at different pressures, and is an improvement on the invention covered by Letters Patent No. 1,192,472, granted to me July 25, 1916.

The object of my invention is to provide a valve by which fluid pressure of one value is released when a fluid pressure of a lower value builds up to a predetermined value. Heretofore, it has been common to control the supply of two fluids of different pressures to a hydraulic press by means of two independent hand operated valves, the exhaust being controlled by a third hand-operated valve. It is my object to simplify the structure so that the admission of the higher pressure to the press or other device is controlled by the pressure of the fluid having the lower pressure after the latter has been built up to a certain value, as will be hereinafter explained.

Referring to the accompanying drawing, Fig. 1 is a side elevation of a valve constructed in accordance with the principles of my invention; Fig. 2, a central longitudinal section thereof; and Fig. 3, a cross section of Fig. 1 on the line III—III. Fig. 4 is a section of a modified detail.

On the drawing, 1 represents the valve casing as a whole, comprising three preferably parallel and integral valve-casings, 2 representing the check-valve casing, 3 the low-pressure valve casing, and 4 the high-pressure valve casing.

The casing 2 contains the chamber 5 closed at its top by the screw plug 6, provided with the valve seat 7, and an inlet passage 8 for the low pressure fluid. The chamber 5 contains the check-valve 9 adapted to the seat 7 and seating against the source of fluid supply through the passage 8. The stem 10 of the valve 9 slides in the opening 11 in the under side of the plug 6.

The casing 3 has the central longitudinal bore or opening 12 provided near the lower end with the exhaust chamber 71 and the exhaust port 13. Within the opening 12 I provide the tubular liner 14 which may be replaced when worn or otherwise damaged. The upper end of the opening 12 is closed by the screw-plug 15. The valve-stem 17 reciprocates through a central hole in the plug 15, which has at its upper end the stuffing-box 18 in which the gland 19 is adjusted by means of the screw-cap 20 working on the exterior of the stuffing-box. The stem 17 is prolonged within the lining 14 so as to form the valve-spindle 22 on which the balanced valve 23 is seated. This valve comprises the central sleeve 26 which is centrally cored or hollowed out nearly from end to end leaving the annular passage 27 between the sleeve 26 and the lining 14, the ends of the sleeve preferably fitting the lining 14 closely.

A packing ring 29 surrounds the spindle 22 and is clamped between the sleeve 26 and the collar 28 thereon. A packing ring 30 is seated in an annular groove in the upper end of the valve head 24. The spindle 22 is screwed into the upper end of the head 24 which clamps and packing ring 30 against the lower end of the sleeve 26. The head 24 has its middle portions reduced to form the chamber 33 between the valve and the liner 14. The lower end of the head 24 carries the packing ring 34 in a recess therein. The clamping block 25 has its upper end screwed into the lower end of the head 24 and clamps the packing ring 34 between them. In the casing 3 there is the annular chamber 37 which communicates with the passage 27 by means of the openings 38 in the liner 14, and with the chamber 5. There is in the casing 3 another annular chamber 39 which communicates with the chamber 33 by means of the openings 40 in the said liner. When the head 24 is in the position shown, the up and down pressures thereon exerted in the passage 33 are balanced.

The casing 4 is provided with the central bore or opening 41 which communicates at its lower end with the larger central opening in the said casing, the opening being closed by the screw-plug 43. Within the opening 41 I place the tubular liner 44 having an enlarged portion or head 45 at its lower end resting against the top of the chamber 42.

In the opening 42 is the piston 46, which has the upper head 47 and the lower head 48 screwed together by the stud 49 which is threaded into an opening in the head 48. The heads clamp between them the packing ring 50 which bears against the wall of the opening 42. The head 48 has a reduced lower end or stem 51 reciprocable in an opening in the nut 43. A packing ring 52 is clamped to the lower end of the stem 51 by the block 32, which has a threaded stud 31 screwed into the lower end of the stem. The chamber 16 in the opening 42 below the piston 46 is connected by the passage 59 in the nut 43 and the pipe 60' to the source of low pressure, for example, to the inlet pipe 61' for the low pressure, as shown on Fig. 2.

The upper head 47 bears the section 74ᵃ of the stem. This section extends up into the liner 44 and has the packing ring 47ᵇ on its upper end. On the packing ring 47ᵇ is the spacing ring 54 on which the packing ring 55 rests. The stem-section 56 has its lower end reduced, extending through the packing rings 47ᵇ and 55 and the ring 54, and screwed into the upper end of the stem-section 47ᵃ. The upper end of the stem-section 56 supports the packing ring 57 which is clamped to the section 56 by the stem-section 58 screwed on the upper end of the section 56.

The liner 44 is surrounded by the annular chamber 63 which communicates with the chamber 64 in the connecting portion of the casings 3 and 4. The chamber 64 is the main or common chamber into which the low and the high pressure fluids pass on their way through the chamber 69 and the passage 66 to any suitable device, such as a press, for applying the pressures to useful work. The chamber 39 also communicates with the chamber 64. Ports 61 in the liner 44 connect the chamber 63 to the chamber 60 in the stem-section 56.

The liner 44 is surrounded by the chamber 69 which communicates with the outlet 66 and also with the chamber 64.

The liner 44 is also surrounded by the chamber 72 which communicates with the port 73 for the fluid having a higher pressure than the fluid which enters the port 8, and also with the ports 74 in the liner 44. The ports 61 and 74 are arranged to be spanned by the chamber 60 in the stem 56 when the packing rings 55 and 57 in the liner 44 descend to their lower limit or to a predetermined place.

75 is the operating lever pivoted between its ends to the link 76 having its lower end pivoted to the top of the plug 6. One end of the lever has the handle 77 and the other end is pivoted to the top of the stem 17.

The casing 2 has the chamber 65 surrounding the liner 14 below the chamber 39. The chamber 65 communicates with the chamber 167 and by the ports 68 with the exhaust chamber 71 in the casing 2. The ports 68 are below the block 25 when the control valve 23 is at its upper or exhaust position, in which position the ports 38 lead into the passage 27, and the ports 40 into the chamber 33.

Water passing above the packing ring 29 and collar 28 escapes through the waste port 78 in the casing 3 and down the external passage 79 and thence through the port 80 to the exhaust chamber 71.

The parts of the apparatus being in the position shown, the handle 77 of the lever is raised causing the stem 22 and parts connected thereto to descend so that the packing ring 30 stands below the ports 40 and 68, the packing ring 29 still being above the ports 38. The low pressure fluid, having, for example, 150 pounds pressure per square inch, passes from the inlet pipe 61' through the port 8, the valve-seat 7, the chamber 5, the passage 27, the ports 40, the ports 38, the chambers 39, 64, and 69, to the outlet 66 connected, for example, to a hydraulic press as shown in my patent aforesaid. Assume that the press requires 75 pounds to lift its plunger and table and the article thereon to be pressed. The low pressure fluid is constantly provided with increasing space as long as the press plunger rises freely, so that the pressure in the press and, therefore, in the chamber 64 and the chamber 167 above the piston 46, will remain not much above 75 pounds until the article on the press-table engages the stationary member of the press, at which time the upward movement of the plunger is very much retarded or possibly nearly stopped. When this occurs, the pressure in the chamber 167 above the piston 46 begins to build up. The pressure upward on the piston 46 being 150 pounds per square inch, it will not be forced downward until the pressure on the top of the piston overcomes that on the bottom thereof. The area of the piston subject to pressure in the chamber 16 is less than that in the chamber 167, so that the piston will be forced to its lowest position shortly before the pressure in the chamber 167 reaches 150 pounds. When the pressure in the chamber 167 builds up so as to depress the piston 46 and the stem sections connected thereto, the packing ring 55 will come to rest below the ports 74 and the packing ring 57 will remain above the ports 61, so that the fluid having the higher pressure, 1000 pounds per square inch, for example, flows through the port 73, the chamber 72, the ports 74, the chamber 60, the ports 61, the passages 64 and 69, and the outlet 66 to the press, thereby causing the article on the press to be subjected to a pressure much in excess of that transmitted thereto by the low-pressure fluid. The high-pressure is also transmitted back from the chamber 64 to the chamber 5, thereby causing the check-valve 9 to be closed on the seat 7.

When the handle of the lever 75 is moved so as to bring the head 24 above the ports 68, the pressure in the chamber 167 above the piston 46 escapes into the exhaust chamber 71 by way of the ports 68, thereby permitting the pressure in the chamber 16 to move the piston 46 and connected parts to the position in which the packing rings 47$^b$ and 55 are on opposite sides of the ports 74, thereby cutting off the high pressure from all the pressure chambers except the chamber 72. This takes place after the packing ring 34 passes the port 68 and before it passes the ports 40. As soon as the packing ring 34 passes the ports 40, the pressure in the chambers 64, 63, and 69 and connected passages and ports escapes into the exhaust chamber 71 by way of the chamber 39 and the ports 40.

When the lever is operated to bring the parts to the position shown, no fluid can pass through the valve because the low-pressure fluid is held in the chamber 27 between the balanced ends of the valve 23, and the constant pressure on the piston 46 from below holds the valve 46 and connected parts so as to cut the high-pressure passage 72 off from the chamber 61 and connected chambers, ports, and passages.

On Fig. 4, I show the nut 43$^a$, corresponding to the nut 43, without the opening 59, but with the outer end closed and provided with the opening 59$^a$ into which the pipe 60' is screwed. The space 16$^b$, corresponding in position to chamber 16 in Fig. 2, is open to atmosphere through the vent 81 and the space 16$^a$ below the packing ring 52 becomes a pressure chamber having the same function as the chamber 16 in Fig. 2.

I do not desire to be restricted to the precise elements and combinations shown and described as many changes therein can be made without departing from the spirit of my invention.

I claim:

1. In a valve, a casing, a main chamber therein, a valve for admitting fluid pressure thereto, a manually-operated valve for admitting lower fluid pressure to the chamber, an exhaust passage, a piston connected to the first valve, and having its ends provided with areas of different sizes subject to fluid pressure, means connecting the larger of said areas with the main chamber and the exhaust passage, the second valve in one positon cutting off the said larger area from the exhaust passage and placing the said larger area in communication with the main chamber, and in another position cutting off the said larger area from the main chamber and placing the said larger area in communication with the exhaust passage, means admitting the lower pressure to the smaller area of the piston to prevent the operation of the first valve when the fluid pressure in the chamber is below a predetermined value, and a check-valve between the second valve and the source of the lower pressure to prevent the fluid from the source of higher pressure from communication with the source of lower pressure.

2. In a valve, a casing, a main chamber therein, a valve for admitting fluid pressure thereto, a manually-operated valve for admitting lower fluid pressure to the chamber, an exhaust passage, a piston connected to the first valve, and having its ends provided with areas of different sizes subject to fluid pressure, means connecting the larger of said areas with the main chamber and the exhaust passage, the second valve in one position cutting off the said larger area from the exhaust passage and placing the said larger area in communication with the main chamber, and in another position cutting off the said larger area from the main chamber and placing the said larger area in communication with the exhaust passage, and means admitting the lower pressure to the smaller area of the piston to prevent the operation of the first valve when the fluid pressure in the chamber is below a predetermined value.

3. In a hydraulic device, a casing having an exhaust port, a main chamber therein, a valve for admitting fluid pressure to the chamber, manually-operated means for admitting lower fluid pressure to the chamber and for connecting the chamber to the exhaust port, a piston connected to the valve and having differential faces, passage-ways for equalizing the pressure per unit of area on both of said faces, whereby the differential pressure on the piston opens the valve to admit the higher pressure to the chamber and the said valve is closed before the chamber is connected to the exhaust port.

Signed at Pittsburgh, Pa., this 8" day of February, 1921.

GEORGE J. STUART.